US008589167B2

(12) United States Patent
Baughman et al.

(10) Patent No.: US 8,589,167 B2
(45) Date of Patent: Nov. 19, 2013

(54) SPEAKER LIVENESS DETECTION

(75) Inventors: Aaron K. Baughman, Silver Spring, MD (US); Jason W. Pelecanos, Ossining, NY (US)

(73) Assignee: Nuance Communications, Inc., Burlington, MA (US)

( * ) Notice: Subject to any disclaimer, the term of this patent is extended or adjusted under 35 U.S.C. 154(b) by 308 days.

(21) Appl. No.: 13/105,857

(22) Filed: May 11, 2011

(65) Prior Publication Data
US 2012/0290297 A1 Nov. 15, 2012

(51) Int. Cl.
*G10L 15/02* (2006.01)
(52) U.S. Cl.
USPC .......................................... 704/270; 704/231
(58) Field of Classification Search
USPC ......... 704/246, 270, 273, 231–245; 279/88.2; 379/88.2
See application file for complete search history.

(56) References Cited

U.S. PATENT DOCUMENTS

| | | | |
|---|---|---|---|
| 3,898,382 | A | 8/1975 | Dalton, Jr. et al. |
| 5,764,777 | A | 6/1998 | Goldfarb |
| 5,787,187 | A | 7/1998 | Bouchard et al. |
| 6,088,669 | A | 7/2000 | Maes |
| 6,477,500 | B2 | 11/2002 | Maes |
| 6,480,825 | B1* | 11/2002 | Sharma et al. ................ 704/270 |
| 7,130,452 | B2 | 10/2006 | Bolle et al. |
| 7,184,521 | B2* | 2/2007 | Sikora et al. .................... 379/69 |
| 7,505,907 | B2 | 3/2009 | Carro |
| 8,010,367 | B2* | 8/2011 | Muschett et al. ............. 704/273 |
| 2002/0169608 | A1 | 11/2002 | Tamir et al. |
| 2008/0172728 | A1* | 7/2008 | Choyi et al. ...................... 726/7 |
| 2009/0055193 | A1 | 2/2009 | Maislos et al. |

OTHER PUBLICATIONS

"Adaptation of the Ear to Sound Stimuli," *J. Acoust. Soc. Am.* 21(2):135-139 (1949).
B.L. Strum, "Ear-Dominance for Pitch Stimuli Using Intertone Methods and Untrained Listeners," *CCRMA*, Stanford University, Stanford, California: Fall 1998.
Dierkes, K., et al., "Enhancement of Sensitivity Gain and Frequency Tuning by Coupling of Active Hair Bundles," *PNAS*, 105(48):18669-18674 (2008).
Nuance, "Customer Care Solutions", (2008).
Shang, W. and Stevenson, M., "Score Normalization in Playback Attack Detection," *in proc. of ICASSP*, 1678-1681(2010).
Higgins, A., et al., "Speaker Verification Using Randomized Phrase Prompting," *Digital Signal Processing*, 89-106 (1991).
Matsui, T. and Furui, S., "Concatenated Phoneme Models for Text-Variable Speaker Recognition," *in. proc. of ICASSP*, 2:391-394(1993).

(Continued)

*Primary Examiner* — Abul Azad
(74) *Attorney, Agent, or Firm* — Hamilton, Brook, Smith & Reynolds, P.C.

(57) ABSTRACT

A signal representative of an unpredictable audio stimulus is provided to a putative live speaker within a putative live recording environment. A second signal purportedly emanating from the putative live speaker and/or the environment is received. This second signal is examined for influence of the unpredictable audio stimulus on the putative live speaker and/or the putative live recording environment. The examining includes at least one of audio feedback analysis, Lombard analysis, and evoked otoacoustic response analysis. Based on the examining, a determination is made as to whether the putative live speaker is an actual live speaker and/or whether the putative live recording environment is an actual live recording environment.

24 Claims, 7 Drawing Sheets

(56) References Cited

OTHER PUBLICATIONS

De Leon, P.L., et al., "Revisiting the Security of Speaker Verification Systems Against Imposture Using Synthetic Speech," *in proc. of ICASSP*, 1798-1801 (2010).
E. Lombard, "The Sign of the Elevation on the Voice," *Annales des Maladies de L'Oreille et du Larynx* XXXVII(2):101-119 (1911). English Translation.
Lombard Effect, downloaded from http://en.wikipedia.org/wiki/Lombard_effect on Apr. 6, 2011.
Swabey, M.A. and Chambers, P., "The Biometric Potential of Transient Otoacoustic Emissions," *Int. J. Biometrics* 1(3):349-364 (2009).
Otoacoustic Emission, downloaded from http://en.wikipedia.org/wiki/Otoacoustic_emission on May 30, 2012.
Chetty, G. and Wagner, M., "Liveness Detection Using Cross-Modal Correlations in Face-voice Person Authentication," *in proc. Interspeech*, 2181-2184 (2005).
Shang, W. and Stevenson, M., "A Playback Attach Detector for Speaker Verification Systems," *ISCCSP*, 1144-1149 (2008).
Swabey, M.A., et al., "Using Otoacoustic Emissions as a Biometric," *ICBA*, Hong Kong, (2004).
Chen, S. S. and Gopalakrishnan, P. S., "Speaker, Environment, and Channel Change Detection and Clustering Via the Bayesian Information Criterion," *in proc. DARPA Broadcast News Transcription & Understanding Workshop*, 127-132 (1998).
Omar, M. K., et al., "Blind Change Detection for Audio Segmentation," *in proc. IEEE International Conference on Acoustics, Speech and Signal Processing*, 501-504 (2005).
Sainath, T. N., et al., "Unsupervised Audio Segmentation Using Extended Baum-Welch Transformations," *IEEE International Conference*, 1:209-212 (2007).
Barras, C., et al., "Improving Speaker Diarization," *in proc. DARPA RT-04F Workshop*, (2004).
Reynolds, D.A. and Torres-Carrasquillo, P., "Approaches and Applications of Audio Diarization," *IEEE International Conference on Acoustics, Speech and Signal Processing*, 5:953-956 (2005).
"Your Ear Noise as Computer Password," downloaded from http://spectrum.ieee.org/riskfactor/computing/it/your_ear_noise_as_computer_pas on Apr. 27, 2011.
"Digital Watermarking Alliance Supports Music Industry Efforts to Sell MP3 Music Downloads and Enhance Consumer Experiences," downloaded from http://www.digitalwatermarkingalliance.org/pr_121806.asp on Apr. 26, 2011.
"Autocorrelation," downloaded from http://en.wikipedia.org./wiki/Autocorrelation on Apr. 27, 2011.
Notification of Transmittal of the International Search Report and The Written Opinion of the International Searching Authority, or the Declaration for International Application No. PCT/US2012/037040, "Speaker Liveness Detection," Date of Mailing Aug. 10, 2012.

* cited by examiner

LOMBARD SPEECH RESPONSE

SPEAKER LIVENESS DETECTION

FIELD OF THE INVENTION

The present invention relates to the electrical, electronic and computer arts, and, more particularly, to automatic speech recognition (ASR) and/or speaker recognition and the like.

BACKGROUND OF THE INVENTION

Biometric technologies enable the authentication of users based on an individual's physiological, cognitive or behavioral characteristics. Performing authentication based on the combination of information available across these traits further improves robustness. For example, conversational biometrics measures both the voice and the knowledge response from the users to perform improved authentication.

Considered in isolation, many biometrics technologies assume relatively cooperative users. Cooperative users obey the basic rules set out for the use of the biometrics system. In reality, however, imposters will attempt to be authenticated by the system by whatever means possible. For example, in an automatic speaker verification system impostors could play back audio material recorded from target speakers in order to deceive the system. More sophisticated approaches may also include speech synthesis for the speaker of interest.

SUMMARY OF THE INVENTION

Principles of the invention provide techniques for speaker liveness detection. In one aspect, an exemplary method includes the steps of providing, to a putative live speaker within a putative live recording environment, a first signal representative of an unpredictable audio stimulus; receiving a second signal purportedly emanating from the putative live speaker and/or the putative live recording environment; examining the second signal for influence of the unpredictable audio stimulus on the putative live speaker and/or the putative live recording environment, the examining comprising at least one of audio feedback analysis, Lombard analysis, and evoked otoacoustic response analysis; and, based on the examining, making a determination whether the putative live speaker is an actual live speaker and/or whether the putative live recording environment is an actual live recording environment.

In one aspect, an exemplary method includes the steps of receiving, from a putative live speaker, a signal purportedly emanating from the putative live speaker; examining the signal purportedly emanating from the putative live speaker for evidence of spontaneous otoacoustic emission; and, based on the examining, making a determination whether the putative live speaker is an actual live speaker.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

Random prompting of speech is no longer required of the user; rather, the only requirement is that the user needs to listen to the stimulus audio while speaking.

For the otoacoustic method, the user does not need to speak.

A user challenge can now include multiple levels of security if needed; for example, not only a random prompting challenge but also the Lombard Reflex and/or otoacoustic challenges.

The tests are difficult to defeat because the audio stimulus played through the line can be different each time. An artificial system would have a difficult challenge circumventing this in an on-line manner.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
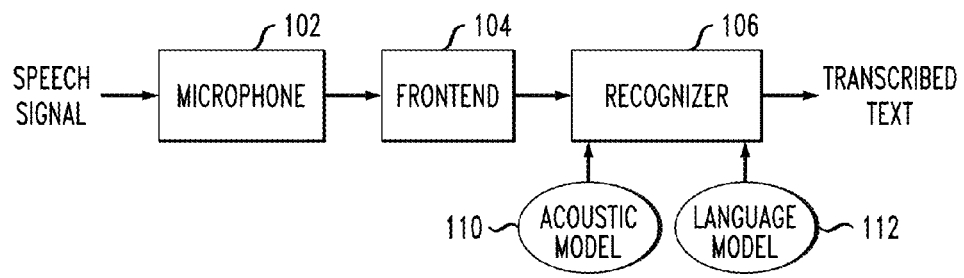
FIG. 1 is a block diagram of a prior art automatic speech recognition system.

One or more embodiments provide techniques for user liveness detection for over-the-phone communication and other form factors (i.e., other audio modalities such as direct interaction with handheld devices such as smart phones, tablet devices, and so on); for example, one or more of a method, apparatus, and computer program product to detect the use of a recording rather than a live speaker.

As noted, biometric technologies enable the authentication of users based on an individual's physiological, cognitive or behavioral characteristics. Performing authentication based on the combination of information available across these traits further improves robustness. For example, conversational biometrics measures both the voice and the knowledge response from the users to perform improved authentication.

Considered in isolation, many biometrics technologies assume relatively cooperative users. Cooperative users obey the basic rules set out for the use of the biometrics system. In reality, however, imposters will attempt to be authenticated by the system by whatever means possible. For example, in an automatic speaker verification system impostors could play back audio material recorded from target speakers in order to deceive the system. More sophisticated approaches may also include speech synthesis for the speaker of interest.

In at least some instances, successfully addressing these types of impostor attacks involves detecting whether a live speaker is being recorded. In case of techniques relying on detecting identical recordings from previous sessions, recordings of the speaker obtained elsewhere could be used to gain access to the system. In case of techniques which use an "audio recording" classifier which has been trained on recordings that have been played back into a telephone microphone, issues will arise in attempting to detect recordings that are played directly through the telephone line, bypassing the cascaded microphone-earpiece-microphone transducer effect.

A number of speaker recognition techniques employ the randomized phrase prompting approach whereby the user is expected to speak unique expressions at each session. Such a system may be countered using more sophisticated methods such as speech synthesis or through interleaved recordings and live speech. Interleaved speech may be detected by checking for channel and speaker consistency.

One or more embodiments are useful not only to authenticate the speaker but also to validate that the speaker is live.

In alternative fields, signals derived from images and audio can be uniquely watermarked such that their source can be validated.

One or more embodiments provide automatic liveness detection in over-the-phone communication. Current, partial techniques include: multi-modal analysis, playback detection, and randomized prompting. In the multi-modal analysis scenario, another mode (such as the use of a live video of a person) is combined with the audio to validate liveness. One potential issue with this is that not all telephones have a video camera attached. One or more embodiments of the invention advantageously do not require a video camera.

The playback detection approach checks if past recordings of the speaker used to verify the person are too similar to the current live audio. One potential issue with this current technique is that recordings of the target person can be retrieved from sources other than previous calls made by the user.

In the randomized prompting approach, the user is required to speak a random sequence of words or digits that is unique to each call. It is then more difficult for pre-recorded attacks to compromise the system. However, speech synthesis systems trained on the user of interest would be capable of breaking in. Consequently, this leaves speaker recognition enabled systems potentially vulnerable to the more ambitious hacker.

One or more embodiments advantageously provide a robust and comprehensive liveness detection mechanism without the need for a human operator in the loop; such mechanism may be useful, for example, in connection with the increasingly widely adopted speaker recognition technologies.

One or more embodiments provide a system, method and/or computer program product to actively induce a physiological, cognitive or environmental watermark on the speaker's audio signal for detecting liveness. One or more embodiments implement liveness detection using one, some, or all of:

The Lombard Effect,
Otoacoustic Signals, and
Other feedback signals (such as room response).

The Lombard Effect is well known in phonetician and automatic speech processing circles. The Lombard effect or Lombard reflex is the involuntary tendency of speakers to increase their vocal effort when speaking in loud noise to enhance the audibility of their voice. This change includes not only loudness but also other acoustic features such as pitch, rate, and duration of sound syllables. This compensation effect results in an increase in the auditory signal-to-noise ratio of the speaker's spoken words. The effect links to the needs of effective communication as there is a reduced effect when words are repeated or lists are read where communication intelligibility is not important. Since the effect is also involuntary, it is used as a means to detect malingering in those simulating hearing loss. Research upon birds and monkeys finds that the effect also occurs in the vocalizations of nonhuman animals. When heard with noise, listeners hear speech recorded in noise better compared to that speech which has been recorded in quiet and then played given with the same level of masking noise. Changes between normal and Lombard speech include: increase in phonetic fundamental frequencies, shift in energy from low frequency bands to middle or high bands, increase in sound intensity, increase in vowel duration, spectral tilting, shift in formant center frequencies for F1 (mainly) and F2, the duration of content words are prolonged to a greater degree in noise than function words, great lung volumes are used, and it is accompanied by larger facial movements but these do not aid as much as its sound changes.

An otoacoustic emission (OAE) is a sound which is generated from within the inner ear. Having been predicted by Thomas Gold in 1948, its existence was first demonstrated experimentally by David Kemp in 1978 and otoacoustic emissions have since been shown to arise by a number of different cellular mechanisms within the inner ear. Studies have shown that OAEs disappear after the inner ear has been damaged, so OAEs are often used in the laboratory and the clinic as a measure of inner ear health. Broadly speaking, there are two types of otoacoustic emissions: spontaneous otoacoustic emissions (SOAEs), which can occur without external stimulation, and evoked otoacoustic emissions (EOAEs), which require an evoking stimulus. OAEs are considered to be related to the amplification function of the cochlea. In the absence of external stimulation, the activity of the cochlear amplifier increases, leading to the production of sound. Several lines of evidence suggest that, in mammals, outer hair cells are the elements that enhance cochlear sensitivity and frequency selectivity and hence act as the energy sources for amplification. One theory is that they act to increase the discriminability of signal variations in continuous noise by lowering the masking effect of its cochlear amplification.

By way of additional detail, an otoacoustic emission is a sound generated from within the inner ear; there are two types, namely, spontaneous otoacoustic emissions, which can occur without external stimulation, and evoked otoacoustic emissions, which require a stimulus. Otoacoustic emissions are related to the amplification function of the cochlea. Without external stimulation, the activity of the cochlear amplifier increases, leading to the production of sound. Otoacoustic emissions are currently evoked using three different methodologies. Stimulus frequency otoacoustic emissions involve application of a pure-tone stimulus, and are detected by the vectorial difference between the stimulus waveform and the recorded waveform. Transient-evoked otoacoustic emissions are evoked with a click (broad frequency range) or toneburst (brief duration pure tone) stimulus. Distortion product otoacoustic emissions are evoked by a pair of primary tones f1 and f2 with particular intensity and ratio.

For reference purposes, FIG. 1 presents an exemplary block diagram for an automatic speech recognition system. A microphone 102 picks up speech and other sounds and generates an electrical signal input to an acoustic front end 104, with the output of 104 routed to recognizer 106 which uses acoustic model 110 and language model 112. Recognizer 106 then employs acoustic model 110 and language model 112 to produce transcribed text corresponding to the input speech. Model 110 car include, for example, a reference acoustic model.

Figure 6:
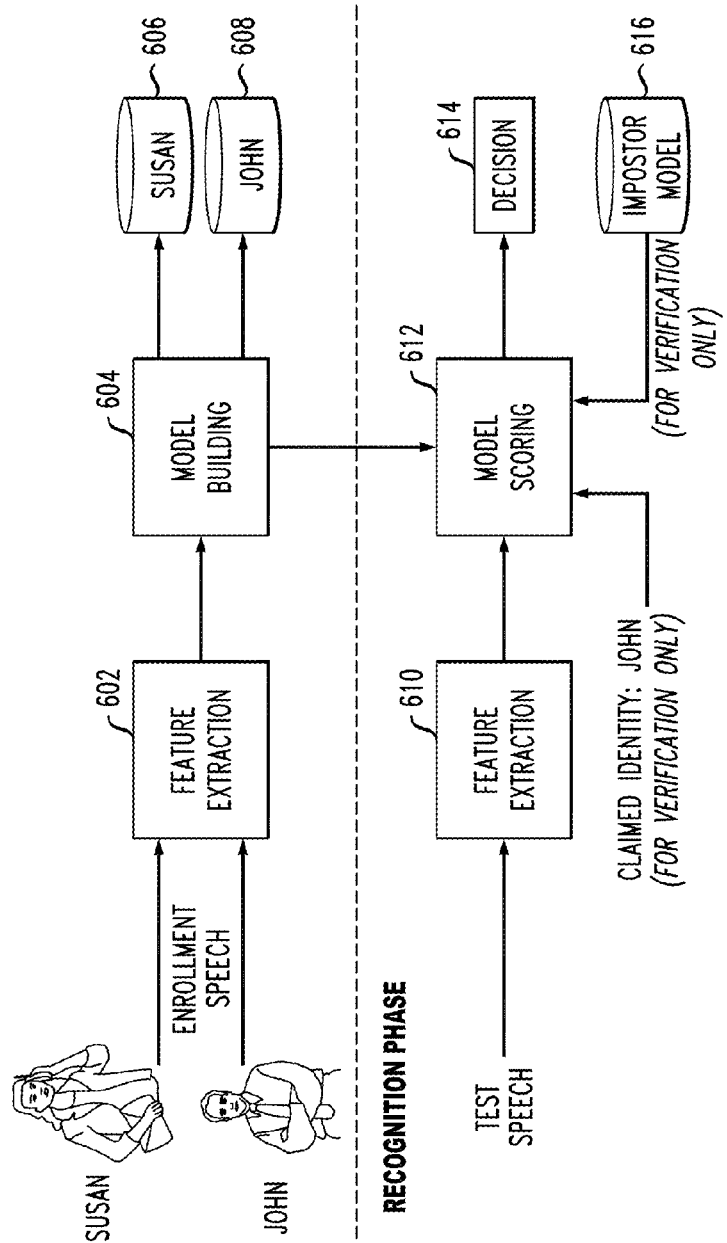
FIG. 6 is a block diagram of a prior art acoustic text-independent speaker recognition system.

For reference purposes, FIG. 6 presents an exemplary block diagram for an acoustic text-independent speaker recognition system. In an enrollment phase, subjects Susan and John provide enrollment speech samples from which features are extracted in block 602 and used to build a model in block 604. The stored models for Susan and John are at 606 and 608. In a recognition phase, test speech is subject to feature extraction in block 610 and model scoring block 612 renders a decision on speaker identity 614 using at least the extracted features and the models built in the enrollment phase. When used for verification, block 612 also makes use of the claimed identity and a suitable imposter model 616. A microphone and acoustic front end can be employed during feature extraction in a well-known manner.

Figure 2:
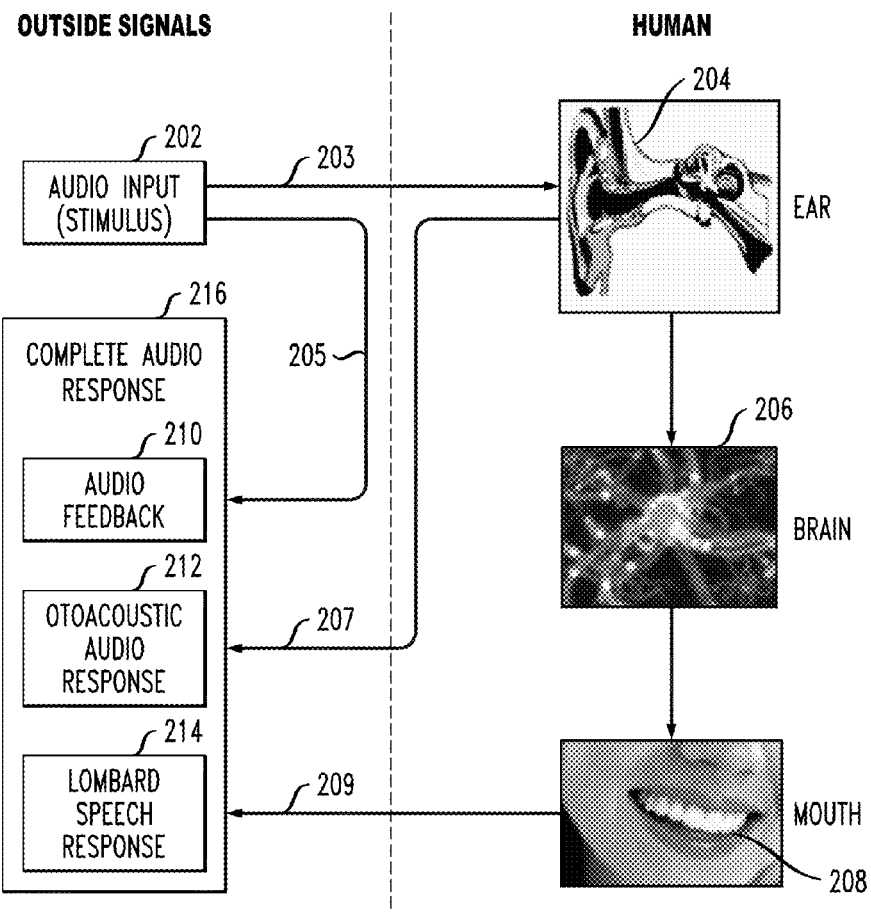
FIG. 2 depicts audio feedback, otoacoustic, and Lombard speech responses employed in accordance with an aspect of the invention.

With reference to FIG. 2, one or more embodiments employ active signal water marking that is mixed within a speaker's voice stream. In particular, as shown at 202, an audio input (stimulus) is applied to (purported) human ear 204. For example, the audio input (stimulus) may be generated in a call center and sent to the (purported) human ear 204 over a suitable telephone network (conventional plain-old telephone service, wireless network, and IP (Internet protocol) telephony are non-limiting examples).

The signal input to the ear 204, represented by arrow 203, is processed by the brain 206 and influences utterances by the mouth 208.

The audio that is returned (arrows 207 and 209), designated as complete audio response 216, includes three aspects: audio feedback 210 (the room response, head and/or mouth configuration, etc.), the otoacoustic audio response 212, and the Lombard Reflex speech response 214. Element 205 is the measurement of the stimulus being played through the earpiece and returning via the handset (i.e., mechanical vibrations through the handset itself) into the microphone and via signal reflections from the room.

Figure 5:
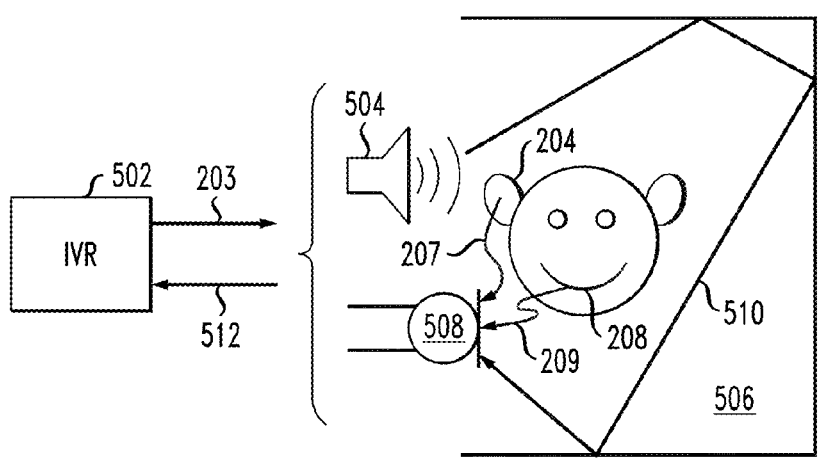
FIG. 5 presents a supplemental view to FIG. 2.

Referring now also to FIG. 5, the audio feedback component 210 involves playing the audio stimulus 203 through a headset or speaker 504, which is then transmitted as sound waves into the current environment 506, and then returns through the pickup microphone or handset 508, as shown at 510. This forms at least a part of the signal returned at 512. The stimulus 203 could originate, for example, in IVR system 502. The transmission of signals shown at 203, 512 could be carried out, for example, over the suitable telephone network mentioned above. The speaker 504 and microphone 508 could be part of a telephone handset or headset, for example, as indicated by the brace "{" in FIG. 5.

The otoacoustic audio response 212 occurs by the audio stimulus 203 entering the ear 204 in the form of sound waves from speaker 504, which excites the inner ear hairs and triggers a tympanic membrane response. The response causes a sound wave to travel back through the ear, producing sound, as shown at 207. For example, a faint acoustic stimulus produces "ringing in the ears" that is mixed into the speaker signal.

The third scenario 214 provides a sound stimulus while a person is speaking. In the presence of an audio stimulus, the speech of the speaker is influenced by the Lombard Reflex. The speaker's speech may change in several ways such as a change in phonetic fundamental frequency, sound intensity, vowel duration, spectral tilting, and speech dynamics. This aspect is represented by arrow 209 from the speaker's mouth 208 to the microphone 508.

Through any one, some, or all of these three possible speech-watermark interactions a measure of speaker liveness can be determined and compared to a threshold to verify liveness.

Thus, as noted, one or more embodiments address automatic liveness detection in over-the-phone and other modes of communication. A significant aspect is that a stimulus sound 203 is played through the earpiece 504 while the user speaks. The speech from the person speaking while listening to the stimulus sound is affected by the characteristics of the stimulus sound. The aforementioned Lombard Reflex effect of a person changing his or her spoken voice according to background audio characteristics can be used to detect a live speaker. Given a known (i.e., to the IVR or other party that seeks to verify liveness) but random stimulus sound and the live recording of the speaker and stimulus interaction a determination of whether the speaker is live or not can be made (in real time or by analyzing the putative "live" recording after the fact).

Another significant aspect in one or more embodiments is, as noted elsewhere, the use of an external acoustic stimulus to evoke a physiological response in the form of an evoked otoacoustic emission. Otoacoustic sounds are caused by the motion of the cochlea's sensory hair cells and are amplified by the cochlea before leaving the inner ear and via the external auditory meatus. For example, faint background noise that is slightly audible passes through a phone (e.g., speaker 504) and enters into a human speaker's ear 204. In around 20 milliseconds, a faintly audible sound or ear ringing enters into the phone (e.g., microphone 508). The addition of the otoacoustic sound into the speech signal determines or at least helps to determine if the speaker is live.

Both the Lombard and otoacoustic signals provide a liveness signature that may be utilized for different liveness detection applications.

Figure 3:
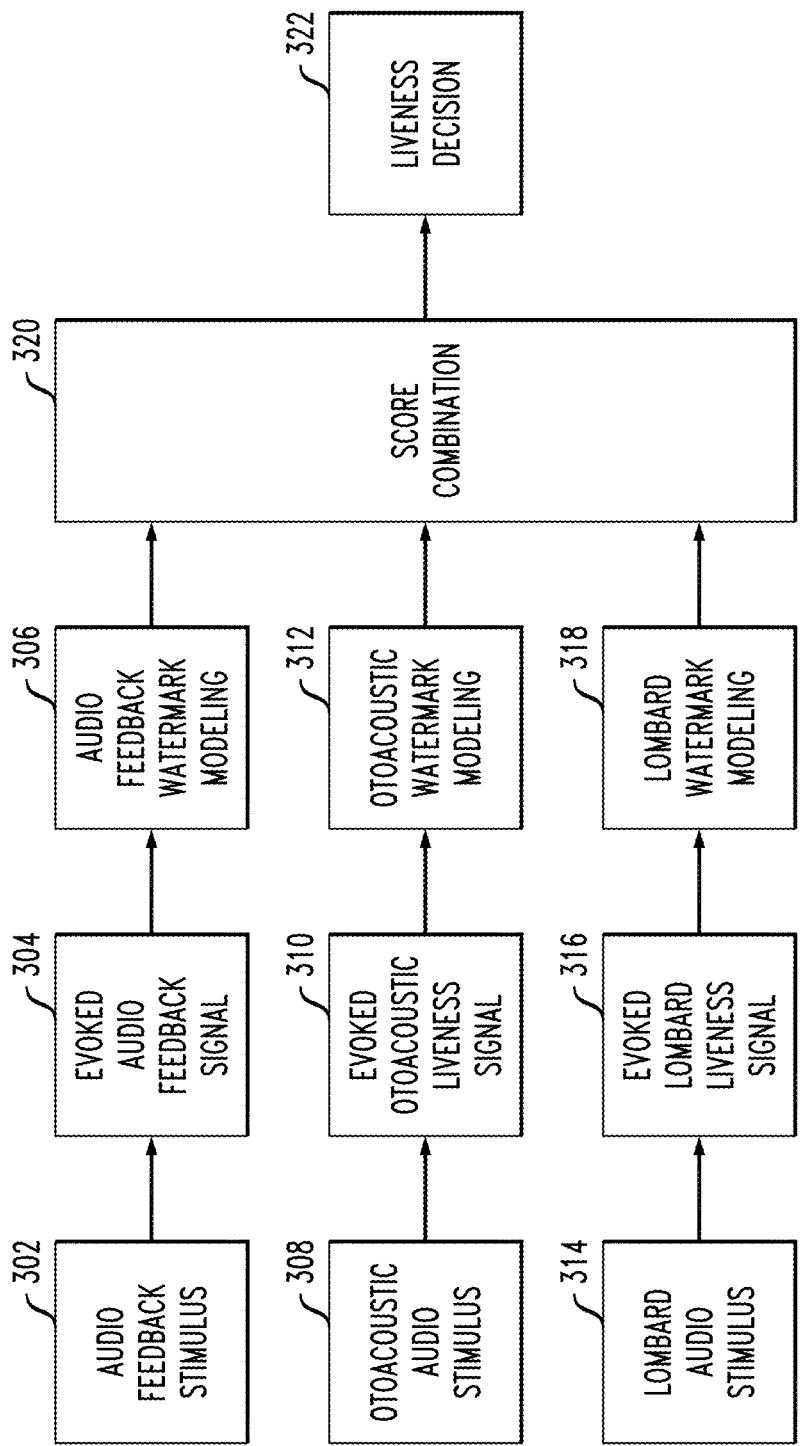
FIG. 3 is a combined block diagram and flow chart, according to an aspect of the invention.

In a non-limiting example, aspects of a system are implemented in an Interactive Voice Response (IVR) system 502. Reference should now also be had to FIG. 3. The IVR 502 can request the user to speak a particular response. While the user is speaking, the IVR plays a known but random sample of audio at differing levels (which in some cases may not be audible). This audio will pass through the telephone line, out of the caller's earpiece 504, and interact with the environment 506 as shown at 510, and some function of these components will return through the caller's microphone 508.

The stimulus for each of the audio feedback, otoacoustic, and Lombard cases is depicted at 302, 308, and 314 respectively, and the corresponding feedback signals are depicted at 304, 310, and 316, these signals correspond to the arrows 510, 207, and 209, respectively.

As shown at 320 and 322, referring to combination of the scores and a decision based thereon, the IVR 502 then processes the live speech recording, which is a function of the telephone line, noise, the audio feedback (room, head and handset response), the Lombard Reflex response from the caller, and the otoacoustic response. Correlations with the random audio stimulus can be measured to then infer liveness. The three information sources may be processed to determine liveness:

The audio feedback analysis determines (1) if there is a real room environment present, and (2) if the caller is near the handset.

The Lombard analysis is, in one or more embodiments, a significant source of information whereby a speaker's speech changes with the audio stimulus presented to the speaker while speaking.

The otoacoustic response can also be analyzed to determine if a physiological evoked acoustic sound is mixed into the complete audio.

Within the embodiment, up to three models, the audio feedback, the Lombard speech response, and the otoacoustic audio response, are trained. Each of the three models can be used to estimate a measure of evidence such as a Log Likelihood Ratio or a Mean Squared Error. This information can be combined across models.

The Audio Feedback component relies on sending an audio stimulus and measuring the returned signal that is a function of the audio environment and the audio stimulus. This includes measuring the expected handset response, the room response and the signal associated with having a caller close to the telephone handset. The handset response to the stimulus should also be consistent with the handset characteristics related to the speech from the caller. The audio response should also exhibit characteristics of the room the handset is present in. The resulting audio can be analyzed using a time or spectral analysis and by detecting longer term correlations with the audio stimulus signal. The audio stimulus can be either inaudible or audible. The audible stimuli can be played in a manner which is transparent to the user by coupling the stimuli with the voice prompts, or modifying the voice prompts of an IVR system, for example. In one or more instances, measuring the response from the inaudible stimuli requires measuring longer term correlations between the sent stimuli and the returned signal.

The Lombard Effect component relies on sending an audio stimulus that is heard by the speaker while the speaker is talking. The interaction between the speaker and the audio stimulus in turn affects the speaker's speech. The speech influenced by a random selection of diverse audio stimuli can be learned and differentiated from speech without the audio stimuli. Speech processing related techniques such as Gaussian Mixture Models (GMMs), Hidden Markov Models (HMMs), Neural Networks and other methods can be used to perform this analysis and classification.

The Otoacoustic element operates by measuring properties related to the ear. This is achieved by playing an audio stimulus into the ear and recording the response of the ear. Speech processing methods, as with the Lombard effect, can be used to model the Lombard speech from a live caller. The applicability of this approach depends on the earpiece and the microphone being within the proximity of the ear. The response from the ear can be used to determine liveness and can be incorporated as a biometric.

For all three types of feedback cases, an engineered (and third party unpredictable) audio input stimulus is used to evoke a characteristic response that can be measured.

In one or more embodiments, the "Audio Input" to "Audio Feedback" loop involves sending one of a specific set of signals through the earpiece of the telephone handset and listening to the returned signal. This effectively measures the properties of the telephone handset and the room response. This audio is compared with the properties of the person's recorded voice over the same session (no use of the Lombard effect in this non-limiting example; in other instances, the Lombard effect could also be used). The system checks that the telephone handset's linear and distortion-related characteristics as well as the room-related characteristics are consistent with the distortion characteristics observed in the live recording.

Hence, rather than just examining the room response and handset response in isolation, this response is coupled with analysis of the speech (watermarked with the audio stimulus) from the speaker to test for channel and distortion consistency.

One or more embodiments thus advantageously permit reliable detection of playback of pre-recorded and synthesized voices either through a direct, line connection or through playback into the telephone handset.

In one or more instances involving the audio feedback aspect, it is desired to try to detect whether the received audio is live or pre-recorded. The latter could be played back (a) in the audio environment itself (i.e. played through a handheld device (not shown) into the telephone handset microphone 508) or (b) directly connected to the telephone line (i.e. a direct wire tap connection, also not shown to avoid clutter).

For the analysis of the room effects, one or more embodiments seek to detect that the measured room effect, when the 'randomized' stimulus is played through the handset, is consistent with that of the person's voice when he or she is speaking. One exemplary property that may be exploited here is the room filtering effects; there will be long-term spectral peaks and valleys aligned with the resonances and dissonances of the room 506 when the speaker is in a particular position in the room. It is anticipated that some of the frequencies that these resonances and dissonances (audio cancellations) occur at when the stimulus signal is played would be similar, or at least related, to those for the live speaker in the room.

For the case of audio played back on a hand-held device or the like within the actual environment, the played back audio would include both the original recording resonances and the room resonances where the audio was played back. For the direct connection case, only the resonances of the original room would be observed. Additionally, not only would the received audio be a function of the room, but it is anticipated that the audio would be a function of the telephone handset distortion. Here the same opportunity to detect the live speaker applies; for the case of audio played back on a handheld device or the like within the actual environment, the received audio would be a function of the cascaded effect of the transform of two handset devices, and, for the direct connection case, a different telephone handset distortion would be observed in comparison with the transformed stimulus signal.

For detecting the live versus recorded audio, two exemplary approaches are provided. In one aspect, analyze the consistency of the spectral peaks and valleys for the received stimulus signal and the speaker's audio. In another aspect, use standard pattern recognition tools to learn the characteristics of recorded audio by analyzing the received stimulus signal and the speaker's audio.

In a further aspect, the background and/or user models can include False Accept (FA) and False Reject (FR) error rates or Receiver Operator Characteristic (ROC) curves that characterize each liveness challenge. The FA describes the probability of a (non-live) recorded voice incorrectly passing a liveness challenge, and the FR is the probability of a live voice incorrectly failing a liveness challenge. A sequence of three types of liveness challenges can be presented to the user. The audio stimuli may be played transparently to the user by applying a stimulus that is close to inaudible, or by overlaying it with, or combining it as part of, the IVR prompt audio. Each liveness challenge produces a score and these scores are aggregated to provide a liveness measure of evidence. In addition to measuring the liveness, it is also important, in at least some cases, to confirm that the same speaker is talking throughout the session by using a speaker change detector. This prevents an impostor from interleaving audio from a recorded voice and his or her own voice to gain unauthorized access to a system.

Thus, one or more embodiments provide a method for speaker liveness detection by inducing signal watermarks through a plurality of cognitive, physiological, and environmental effects using audio stimuli.

In some cases, the liveness challenge includes audio feedback employing, for example, models of room responses, handset response feedback, handset and/or user positioning, mouth response, and/or other related audio altering properties. Suitable training can be carried out on the bank of audio feedback classifiers, and audio feedback evidence can be accumulated for determining liveness.

In one or more embodiments, the liveness challenge employs aspects of the Lombard effect, including classifiers of Lombard effect-related features such as vowel duration, intensity, and other deviations from expected speech properties. Suitable training can be carried out on the bank of Lombard effect features, and Lombard effect evidence can be accumulated for determining liveness.

In some instances, the liveness challenge employs aspects of the otoacoustic audio response, including classifiers of otoacoustic effect features such as deviations in ear response and related features. Suitable training can be carried out on the bank of otoacoustic effect features, and otoacoustic effect evidence can be accumulated for determining liveness.

In some cases, each of the liveness modules are aggregated into a liveness score to determine an overall measure of evidence.

In general, the audio stimuli can be either inaudible or audible.

In some embodiments, the liveness detection system is coupled with a speaker change detection system.

Furthermore, one or more embodiments provide a method for ascertaining if input to a user system is provided by a live user. Exemplary method steps include delivering randomized audio signals to the system; and measuring response signals input at the user system to determine if the response signals were input by a live user.

In some cases, the system includes an earpiece and the audio signals include barely audible signals delivered to the earpiece; furthermore, the measuring includes analyzing otoacoustic (i.e., involuntary inner ear) response signals.

In one or more embodiments, the system generates a prompt to be spoken by the user and the randomized audio signals include audio stimulus generated during the user response and causing a live user to vary speech input to the user system (other than semantic content; i.e., not saying different words but the properties of the speech itself change) in response to the audio stimulus. It should also be noted that not all embodiments require stimulus. For example, spontaneous otoacoustic emissions do not require a stimulus; in such cases signals 207 occur spontaneously and not in response to stimulus 203.

In some instances, the response signals represent audio characteristics of a room and additional steps include prompting input of user response signals; receiving the user response signals; and determining if the user response signals include response signals representing audio characteristics of the room. Such audio characteristics of the room can be determined a priori by measurement during times when the stimulus is being played but the user is not speaking; this can also be achieved by playing the stimulus and measuring the long-term correlation information independent of the speaker (for example measuring reverberations as delays of varying strength).

Some embodiments thus provide speaker liveness detection given an evoked acoustic watermark from speech; in turn, the signal is processed and compared to a baseline speaker signal to determine liveness of the speaker.

One or more embodiments thus present the user with a stimulus audio and analyze the audio that is returned. The audio that is returned potentially includes three different types. As discussed elsewhere herein, these are the audio feedback, the otoacoustic audio response and the Lombard Reflex speech response. The audio feedback component is simply the audio stimulus that is played through a headset or speaker, being transmitted as sound waves in the current environment and then returning through the pickup microphone or handset. The otoacoustic audio response occurs by the audio stimulus entering the ear in the form of sound waves, which then excites the inner ear hairs and triggers a tympanic membrane response. This causes a sound wave to travel back through the ear, with the ear producing sound. For example, a faint acoustic stimulus produces "ringing in the ears" that is mixed into the speaker signal. The otoacoustic sound changes depending on the stimulus intensity, duration, and frequency. For the third scenario, a (randomized) sound stimulus is played while the person is speaking which invokes a Lombard Reflex from the speaker. The speaker's speech may change in several ways and examples are set forth elsewhere herein; non-limiting examples include an increase in phonetic fundamental frequencies and in sound intensity, an increase in vowel duration, occurrence of spectral tilting, and an increased lung volume.

Figure 7:
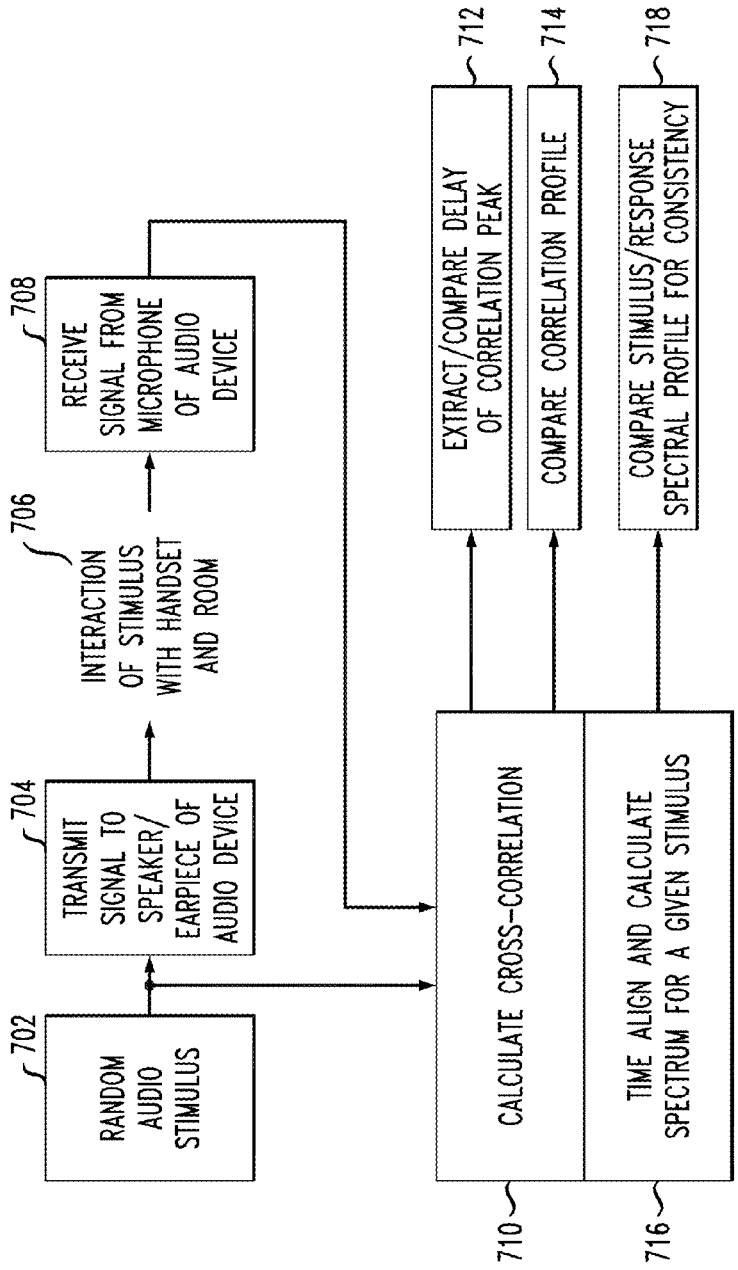
FIGS. 7-9 depict, respectively, block diagrams for audio feedback, otoacoustic, and Lombard speech responses, in accordance with an aspect of the invention.

FIG. 7 presents a more detailed flow chart and block diagram of an embodiment employing the room and handset response for speaker liveness detection. A random audio stimulus 702 is provided and transmitted to the earpiece of the putative speaker's handset at 704. The stimulus is also provided to the cross-correlation calculation block 710. At 706, the stimulus interacts with the handset and room, and at 708 a signal is received from the microphone of the putative speaker's audio device. This is also supplied to block 710. The delay of the correlation peak(s) is/are extracted and compared in block 712 and the correlation profiles are compared in block 714. Two checks can be made to detect liveness; namely, a check of the spectral or correlation information with the actual room and handset, and an ongoing check for consistency of the response over the duration of the call or other interaction with the system. Note at 716 time alignment and spectrum calculation for a given stimulus, and at 718 the comparison of the stimulus/response spectral profile for consistency.

Figure 8:
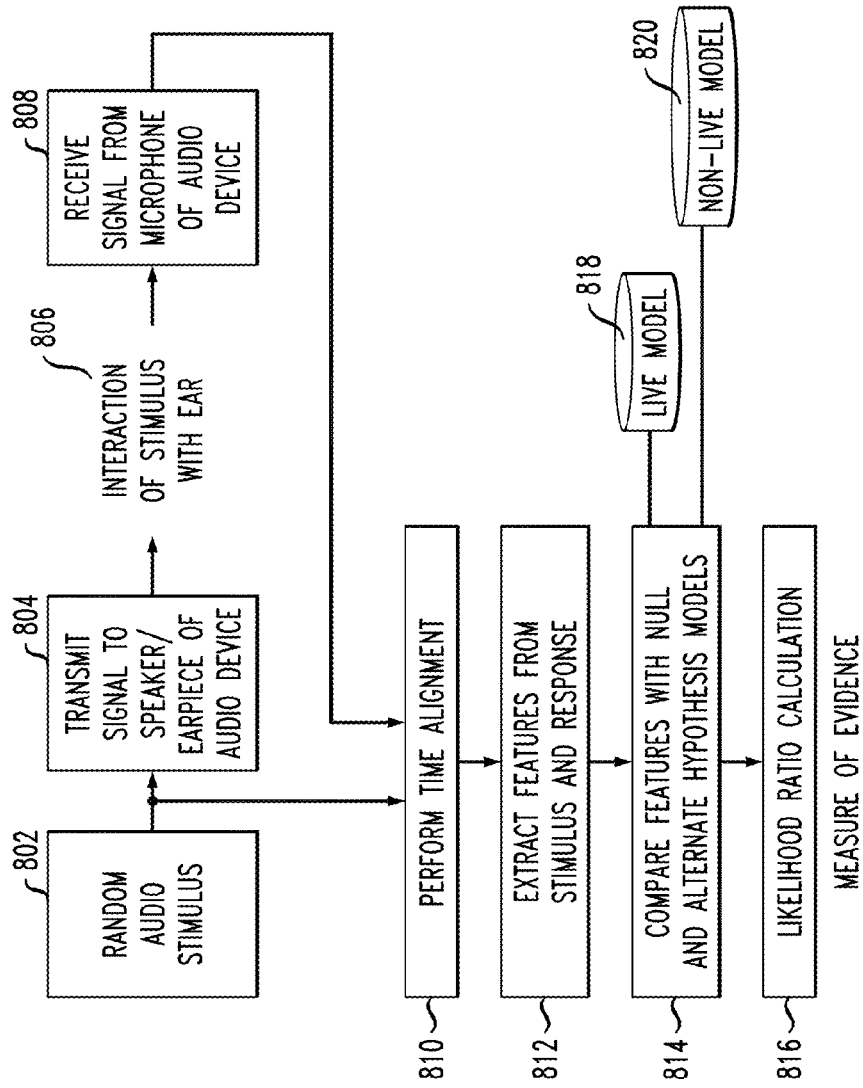

FIG. 8 presents a more detailed flow chart and block diagram of an embodiment employing the (evoked) otoacoustic response for speaker liveness detection. A random audio stimulus 802 is provided and transmitted to the earpiece of the putative speaker's handset at 804. The stimulus is also provided to the time-alignment block 810. At 806, the stimulus interacts with the ear, and at 808 a signal is received from the microphone of the putative speaker's audio device. This is also supplied to block 810. Features from the stimulus and response are extracted in block 812 and the features are compared with a live model 818 and non-live model 820 in block 814. A likelihood ratio calculation is then made in block 816 to determine whether the putative speech is live.

Figure 9:
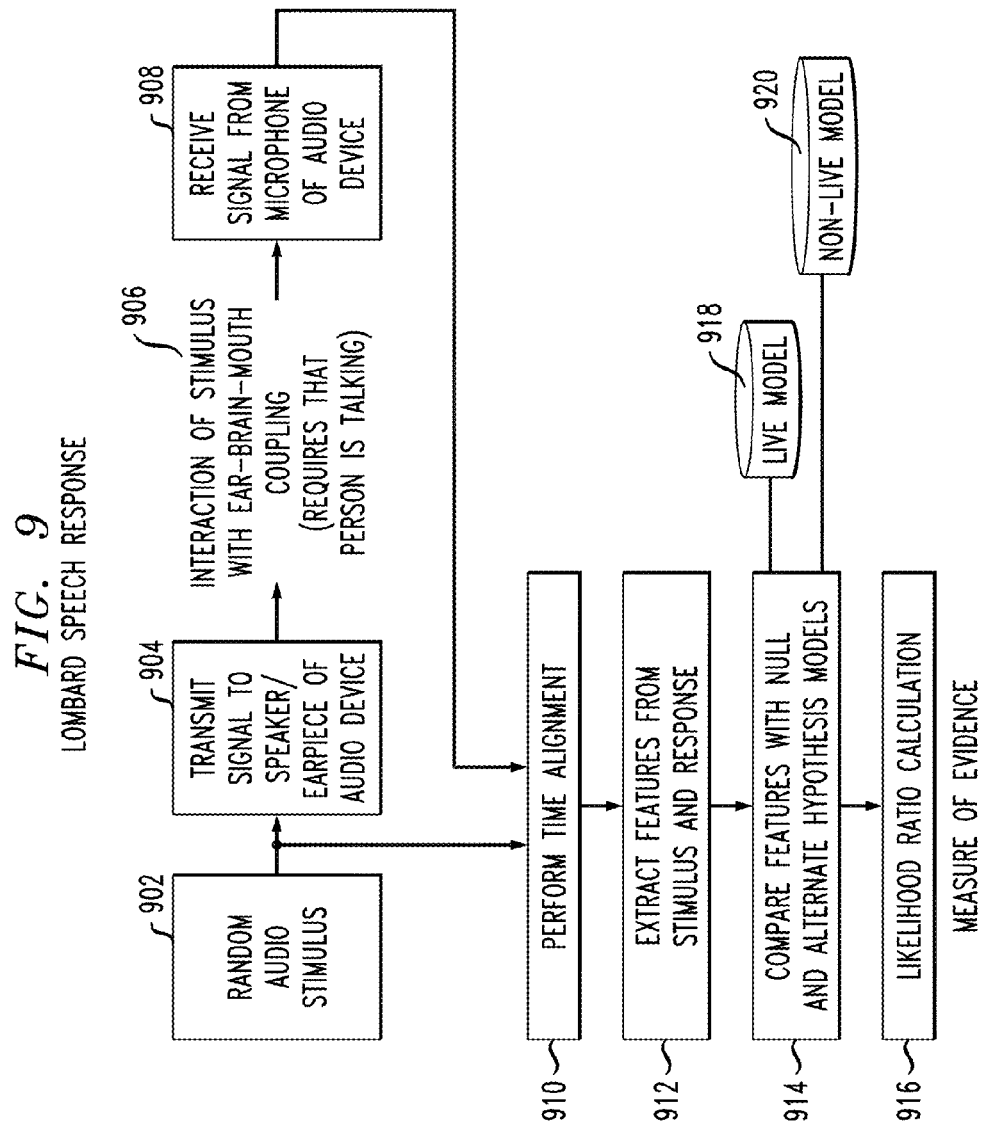

FIG. 9 presents a more detailed flow chart and block diagram of an embodiment employing the Lombard speech response for speaker liveness detection. A random audio stimulus 902 is provided and transmitted to the earpiece of the putative speaker's handset at 904. The stimulus is also provided to the time-alignment block 910. At 906, the stimulus interacts with the ear-brain-mouth coupling, and at 908 a signal is received from the microphone of the putative speaker's audio device. This is also supplied to block 910. Features from the stimulus and response are extracted in block 912 and the features are compared with a live model 918 and non-live model 920 in block 914. A likelihood ratio calculation is then made in block 916 to determine whether the putative speech is live.

Recapitulation

Given the discussion thus far, it will be appreciated that, in general terms, an exemplary method, according to an aspect of the invention, includes the step of providing, to a putative live speaker (e.g., with mouth 208 and ear 204) within a putative live recording environment 506, a first signal representative of an unpredictable audio stimulus. Such stimulus is, in some embodiments, known only to the server or other device producing the stimulus and is not re-used. An additional step includes receiving, from the putative live speaker, a second signal purportedly emanating from the putative live speaker and/or the environment (such signal broadly understood to include one or more of signals 205, 207, and 209). A further step includes examining the second signal for influence of the unpredictable audio stimulus on the putative live speaker and/or the putative live recording environment. Such examining includes at least one of audio feedback analysis 210, Lombard analysis 214, and evoked otoacoustic response analysis 212. A further step includes, based on the examining, making a determination whether the putative live speaker is an actual live speaker and/or whether the putative live recording environment is an actual live recording environment. One application of the latter determination is in the case of recording a remote signal where it is desired to make sure that no one has cut the line and put his or her own signal on top.

Note that, as used herein, a signal emanating from a speaker may include speech of the speaker and/or otoacoustic signals from the ear, unless expressly recited differently or otherwise apparent from the context.

In some cases, such as depicted in FIG. 5, the environment 506 is a remote environment, the providing includes sending over a network, as at 203, and the receiving includes receiving over the network, as at 512.

With particular reference to FIG. 7, in some cases, the examining includes at least the audio feedback analysis, and the method further includes at least one of (i) calculating cross-correlation between the first and second signals, as at 710, and (ii) conducting spectral analysis across the first and second signals, as at 716; and determining whether the calculated cross-correlation or spectral analysis, as the case may be, is consistent with the putative live speaker using an actual telephone handset within an actual room, as at 712, 714 and/or 718.

With particular reference to FIG. 9, in some cases, the examining includes at least the Lombard analysis; the signal purportedly emanating from the putative live speaker within the remote environment includes a signal representative of purported live speech of the putative live speaker within the remote environment; and the influence of the unpredictable audio stimulus includes at least one of increase in phonetic fundamental frequencies, shifts in energy away from low frequency bands, increase in sound intensity, increase in vowel duration, spectral tilting, shift in formant center frequencies, lung volume, larger facial movements, change in spectral characteristics, and prolonged duration of content words as compared to function words. In such cases, the making of the determination includes extracting features from the signal representative of the unpredictable audio stimulus and the signal purportedly emanating from the putative live speaker within the remote environment, as at 912; and comparing the extracted features with speaker-independent live and non-live models trained with Lombard and non-Lombard speech, respectively, as at 914, 916, 918, and 920.

In a non-limiting example, examine spectral characteristics, such as Mel-frequency cepstral coefficients (MFCCs)), and train several models, e.g., a model with attributes of Lombard speech and a model with attributes of non-Lombard speech. Test which model is more likely, using a likelihood ratio or the like. Models 918, 920 are, in some cases, speaker-independent models for population at large.

With particular reference to FIG. 8, in some cases, the examining includes at least the evoked otoacoustic response analysis; the second signal includes a signal representative of an evoked otoacoustic response of the putative live speaker within the remote environment; and the influence of the unpredictable audio stimulus includes an evoked otoacoustic response induced in an ear of the putative live speaker by the unpredictable audio stimulus. In such cases, the making of the determination includes extracting features from the first signal and the second signal, as at 812; and comparing the extracted features with speaker-independent live and non-live models trained with and without the stimulus, respectively, as at 814, 816, 818, 820. The training approach is suitable in cases of the evoked response. Biometric techniques can be employed in evoked or spontaneous cases.

With reference to FIG. 3, in some cases, any two or more of audio feedback, otoacoustic response, and Lombard analysis can be combined. Furthermore, examining the signal purportedly emanating from the putative live speaker within the environment for evidence of spontaneous otoacoustic emission can be carried out on a stand-alone basis or combined with any one or more of the other techniques (i.e., evoked otoacoustic, audio feedback, and Lombard). In such cases, the determination whether the putative live speaker is an actual live speaker is further based on the evidence of the spontaneous otoacoustic emission.

As noted, the unpredictable audio stimulus may be audible or inaudible.

In some cases, a further step includes monitoring the second signal to detect a speaker change. A speaker change detector can be implemented using well-known techniques. For example, an input audio stream may be modeled as a Gaussian process in the cepstral space and a maximum likelihood approach to detect turns of a Gaussian process, based on the Bayesian Information Criterion (BIC), is employed. Alternatively, unsupervised speaker-based audio segmentation techniques known in the art may be employed in detecting speaker change. Clustering methods, for example, based on a Gaussian mixture model or a Bayesian information criterion (BIC) may also be employed to detect speaker change.

Given the teachings herein, the skilled artisan will be able to build a speaker change detector that can be combined with the liveness detection techniques herein; for example, by breaking up the speech into homogeneous chunks using the Bayesian Information Criterion (BIC) algorithm or the like. This is followed by training a model for each chunk. The models are then compared and merged if they are similar and are considered as different speakers if the models are significantly different.

One or more embodiments implement "continuous checking" (besides the speaker change detection). Continuous checking combined with methods to ensure that it is the same speaker throughout the call is helpful. For example, consider a customer being threatened to speak for the authentication component of a call (to make a balance transfer) and then an unauthorized party handles the rest of the call to complete the transaction.

Appropriate use can be made of the detection results for any of the techniques discussed herein. In some cases, if the result is an indication that the speaker is not live, obtain more audio and in the case of a call center patch the "call" through to a human operator for direct interaction with the purported subject. This helps quality of service (QoS) if the system made a mistake and also helps to apprehend an unauthorized party. In some cases, if result is that the person is indeed live, allow access to a system, facility, or the like; for example, by sending a suitable signal to facilitate such access. In typical cases, access is allowed only if one or more other security criteria are also met.

As noted, one or more embodiments can be used in connection with a variety of form factors. For example, in some cases, the environment is a local environment, the providing step includes playing from a portable electronic device, and the receiving step includes receiving at the portable electronic device.

As noted, in some instances, the spontaneous otoacoustic emission can be used by itself without stimulus. In such cases, an exemplary method includes receiving, from a putative live speaker, a signal purportedly emanating from the putative live speaker; examining the signal purportedly emanating from the putative live speaker for evidence of spontaneous otoacoustic emission (for example, with a suitable biometric technique); and, based on the examining, making a determination whether the putative live speaker is an actual live speaker.

It should be noted that, as described herein, suitable means for carrying out the methods include one or more of servers or other general purpose computers, telephone network(s), computer network(s), microphone(s), speaker(s), handsets and/or headsets, analog to digital converters, acoustic front end with appropriate filter banks, handheld electronic devices, and software modules embodied in a computer-readable storage medium which include program code with logic to carry out Gaussian mixture modeling, hidden Markov modeling, autocorrelation, log likelihood ratio calculation, mean squared error calculation, and other techniques described herein.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
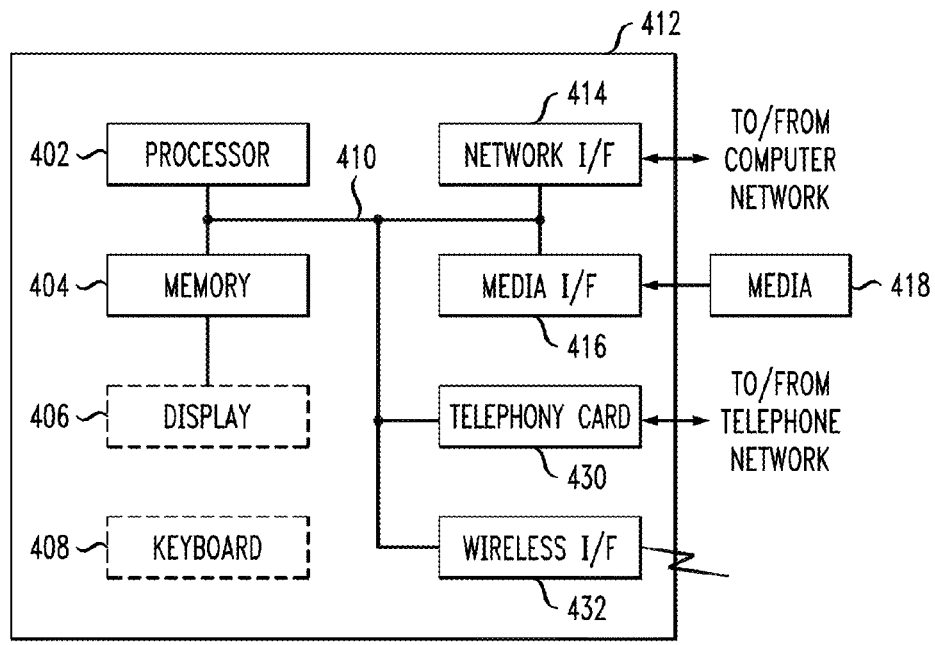
FIG. 4 depicts a computer system that may be useful in implementing one or more aspects and/or elements of the invention.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

Also included are a telephony card 430 coupled to the bus and interfacing with a telephone network, and a wireless interface 432 coupled to the bus and interfacing with a local and/or cellular wireless network.

System 412 is representative of a handheld device such as a personal digital assistant, smart phone, or tablet; system 412 is also representative of a server in a call center or the like. Some embodiments make use of multiple servers in a call center, implementing an interactive voice response (IVR) system. The multiple servers may be coupled over a local computer network (e.g. Ethernet) via network interfaces 414. Duties may be apportioned among servers; for example, some servers provide telephone access via cards 430; some servers carry out "number crunching" for speech and speaker recognition and liveness detection, and so on. Where techniques are carried out on a handheld device, some or all processing may be carried out externally. For example, signals can be sent wirelessly via interface 432 to a powerful external server, possibly with some local pre-processing first.

As used herein, including the claims, a "server" includes a physical data processing system (for example, system 412 as shown in FIG. 4) running a server program. It will be understood that such a physical server may or may not include a display and keyboard. Further, not every server or handheld device will necessarily have every feature depicted in FIG. 4.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, FORTRAN, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or Limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   providing, to a putative live speaker within a putative live recording environment, a first signal representative of an unpredictable audio stimulus;
   receiving a second signal purportedly emanating from at least one of said putative live speaker and said putative live recording environment, the second signal including an audio response associated with the unpredictable audio stimulus;
   examining said second signal for determining whether characteristics of the audio response associated with the unpredictable audio stimulus are consistent with response characteristics observed in a live recording based on features associated with the first signal and the second signal, said examining comprising at least one of audio feedback analysis, Lombard analysis, and evoked otoacoustic response analysis; and
   based on said examining, making a determination as to at least one of:
      whether said putative live speaker is an actual live speaker; and
      whether said putative live recording environment is an actual live recording environment.

2. The method of claim 1, wherein said putative live recording environment comprises a remote environment, said providing comprises sending over a network, and said receiving comprises receiving over said network.

3. The method of claim 2, wherein said examining comprises at least said audio feedback analysis, further comprising:
   at least one of:
      calculating cross-correlation between said first signal and said second signal, and
      conducting spectral analysis of said first signal and said second signal; and
   determining whether said at least one of said calculated cross-correlation and said spectral analysis is consistent with said putative live speaker using an actual telephone handset within an actual room.

4. The method of claim 2, wherein:
   said examining comprises at least said Lombard analysis;
   said second signal comprises a signal representative of purported live speech of said putative live speaker within said remote environment;
   said determining whether characteristics of the audio response associated with the unpredictable audio stimulus are consistent with response characteristics observed in a live recording comprises determining at least one of increase in phonetic fundamental frequencies, shifts in energy away from low frequency bands, increase in sound intensity, increase in vowel duration, spectral tilting, shift in formant center frequencies, lung volume, larger facial movements, change in spectral characteristics, and prolonged duration of content words as compared to function words; and
   said examining and said making of said determination comprise:
      extracting the features from said first signal and said second signal; and
      comparing said extracted features with speaker-independent live and non-live models trained with Lombard and non-Lombard speech, respectively.

5. The method of claim 2, wherein:
   said examining comprises at least said evoked otoacoustic response analysis;
   said second signal comprises a signal representative of an evoked otoacoustic response of said putative live speaker within said remote environment;
   said determining whether characteristics of the audio response associated with the unpredictable audio stimulus are consistent with response characteristics observed in a live recording comprises determining an evoked otoacoustic response induced in an ear of said putative live speaker by said unpredictable audio stimulus; and
   said examining and said making of said determination comprises:
      extracting the features from said first signal and said second signal; and comparing said extracted features with speaker-independent live and non-live models trained with and without said stimulus, respectively.

6. The method of claim 2, wherein said examining comprises at least said audio feedback analysis, said Lombard analysis, and said otoacoustic response analysis, further comprising combining a score from said audio feedback analysis, a score from said Lombard analysis, and a score from said otoacoustic response analysis to determine a combined score, wherein said making of said determination is based on said combined score.

7. The method of claim 2, wherein said examining comprises at least two of said audio feedback analysis, said Lombard analysis, and said otoacoustic response analysis, further comprising combining scores from said at least two of said audio feedback analysis, said Lombard analysis, and said otoacoustic response analysis to determine a combined score, wherein said making of said determination is based on said combined score.

8. The method of claim 2, wherein said unpredictable audio stimulus is audible.

9. The method of claim 2, wherein said unpredictable audio stimulus is inaudible.

10. The method of claim 2, further comprising monitoring said second signal to detect a speaker change.

11. The method of claim 1, wherein said environment comprises a local environment, said providing comprises playing from a portable electronic device, and said receiving comprises receiving at said portable electronic device.

12. The method of claim 1, wherein:
said examining further comprises examining said second signal for evidence of spontaneous otoacoustic emission;
said making of said determination comprises at least making said determination as to whether said putative live speaker is an actual live speaker; and
said determination as to whether said putative live speaker is an actual live speaker is based at least in part on said evidence of said spontaneous otoacoustic emission.

13. An article of manufacture comprising a computer program product, said computer program product comprising:
a computer readable storage medium, storing in a non-transitory manner computer readable program code, the computer readable program code comprising:
computer readable program code configured to provide, to a putative live speaker within a putative live recording environment, a first signal representative of an unpredictable audio stimulus;
computer readable program code configured to receive a second signal purportedly emanating from at least one of said putative live speaker and said putative live recording environment, the second signal including an audio response associated with the unpredictable audio stimulus;
computer readable program code configured to examine said second signal for determining whether characteristics of the audio response associated with the unpredictable audio stimulus are consistent with response characteristics observed in a live recording based on features associated with the first signal and the second signal, said examining comprising at least one of audio feedback analysis, Lombard analysis, and evoked otoacoustic response analysis; and
computer readable program code configured to, based on said examining, make a determination as to at least one of:
whether said putative live speaker is an actual live speaker; and
whether said putative live recording environment is an actual live recording environment.

14. The article of manufacture of claim 13, wherein:
said putative live recording environment comprises a remote environment;
said providing comprises sending over a network;
said receiving comprises receiving over said network; and
said examining comprises at least said audio feedback analysis, further comprising:
computer readable program code configured to perform at least one of:
calculating cross-correlation between said first signal and said second signal, and
conducting spectral analysis of said first signal and said second signal; and
computer readable program code configured to determine whether said at least one of said calculated cross-correlation and said spectral analysis is consistent with said putative live speaker using an actual telephone handset within an actual room.

15. The article of manufacture of claim 13, wherein:
said putative live recording environment comprises a remote environment;
said providing comprises sending over a network;
said receiving comprises receiving over said network;
said examining comprises at least said Lombard analysis;
said second signal comprises a signal representative of purported live speech of said putative live speaker within said remote environment; and
said determining whether characteristics of the audio response associated with the unpredictable audio stimulus are consistent with response characteristics observed in a live recording comprises determining at least one of increase in phonetic fundamental frequencies, shifts in energy away from low frequency bands, increase in sound intensity, increase in vowel duration, spectral tilting, shift in formant center frequencies, lung volume, larger facial movements, change in spectral characteristics, and prolonged duration of content words as compared to function words;
further comprising:
computer readable program code configured to extract the features from said first signal and said second signal; and
computer readable program code configured to compare said extracted features with speaker-independent live and non-live models trained with Lombard and non-Lombard speech, respectively.

16. The article of manufacture of claim 13, wherein:
said putative live recording environment comprises a remote environment;
said providing comprises sending over a network;
said receiving comprises receiving over said network;
said examining comprises at least said evoked otoacoustic response analysis;
said second signal comprises a signal representative of an evoked otoacoustic response of said putative live speaker within said remote environment; and
said determining whether characteristics of the audio response associated with the unpredictable audio stimulus are consistent with response characteristics observed in a live recording comprises determining an evoked otoacoustic response induced in an ear of said putative live speaker by said unpredictable audio stimulus;
further comprising:

computer readable program code configured to extract the features from said first signal and said second signal; and computer readable program code configured to compare said extracted features with speaker-independent live and non-live models trained with and without said stimulus, respectively.

17. An apparatus comprising:

a memory; and at least one processor, coupled to said memory, and operative to:
provide, to a putative live speaker within a putative live recording environment, a first signal representative of an unpredictable audio stimulus;
receive a second signal purportedly emanating from at least one of said putative live speaker and said putative live recording environment, the second signal including an audio response associated with the unpredictable audio stimulus;
examine said second signal for determining whether characteristics of the audio response associated with the unpredictable audio stimulus are consistent with response characteristics observed in a live recording based on features associated with the first signal and the second signal, said examining comprising at least one of audio feedback analysis, Lombard analysis, and evoked otoacoustic response analysis; and
based on said examining, make a determination as to at least one of:
whether said putative live speaker is an actual live speaker; and
whether said putative live recording environment is an actual live recording environment.

18. The apparatus of claim 17, wherein:

said putative live recording environment comprises a remote environment;

said providing comprises sending over a network;

said receiving comprises receiving over said network; and said examining comprises at least said audio feedback analysis, said at least one processor being further operative to:
perform at least one of:
calculating cross-correlation between said first signal and said second signal, and
conducting spectral analysis of said first signal and said second signal; and
determine whether said at least one of calculated cross-correlation and said spectral analysis is consistent with said putative live speaker using an actual telephone handset within an actual room.

19. The apparatus of claim 17, wherein:

said putative live recording environment comprises a remote environment;

said providing comprises sending over a network;

said receiving comprises receiving over said network;

said examining comprises at least said Lombard analysis;

said second signal comprises a signal representative of purported live speech of said putative live speaker within said remote environment; and said determining whether characteristics of the audio response associated with the unpredictable audio stimulus are consistent with response characteristics observed in a live recording based on features associated with the first signal and the second signal comprises determining at least one of increase in phonetic fundamental frequencies, shifts in energy away from low frequency bands, increase in sound intensity, increase in vowel duration, spectral tilting, shift in formant center frequencies, lung volume, larger facial movements, change in spectral characteristics, and prolonged duration of content words as compared to function words;

said at least one processor being further operative to:
extract features from said first signal and said second signal; and
compare said extracted features with speaker-independent live and non-live models trained with Lombard and non-Lombard speech, respectively.

20. The apparatus of claim 17, wherein:

said putative live recording environment comprises a remote environment;

said providing comprises sending over a network;

said receiving comprises receiving over said network;

said examining comprises at least said evoked otoacoustic response analysis;

said second signal comprises a signal representative of an evoked otoacoustic response of said putative live speaker within said remote environment; and said determining whether characteristics of the audio response associated with the unpredictable audio stimulus are consistent with response characteristics observed in a live recording based on features associated with the first signal and the second signal comprises determining an evoked otoacoustic response induced in an ear of said putative live speaker by said unpredictable audio stimulus;

said at least one processor being further operative to:
extract the features from said first signal and said second signal purportedly emanating from said putative live speaker within said remote environment; and
compare said extracted features with speaker-independent live and non-live models trained with and without said stimulus, respectively.

21. An apparatus comprising:

means for providing, to a putative live speaker within a putative live recording environment, a first signal representative of an unpredictable audio stimulus;

means for receiving a second signal purportedly emanating from at least one of said putative live speaker and said putative live recording environment;

means for examining said second signal for determining whether characteristics of the audio response associated with the unpredictable audio stimulus are consistent with response characteristics observed in a live recording based on features associated with the first signal and the second signal, said examining comprising at least one of audio feedback analysis, Lombard analysis, and evoked otoacoustic response analysis; and means for, based on said examining, making a determination as to at least one of:
whether said putative live speaker is an actual live speaker; and
whether said putative live recording environment is an actual live recording environment.

22. The apparatus of claim 21, wherein:

said putative live recording environment comprises a remote environment;

said providing comprises sending over a network;

said receiving comprises receiving over said network; and said means for examining comprise at least means for performing said audio feedback analysis, further comprising:
means for performing at least one of:
calculating cross-correlation between said first signal and said second signal, and conducting spectral analysis of said first signal and said second signal; and means for determining whether said at least one of said calculated cross-correlation and said spectral analysis is consistent with said putative live speaker using an actual telephone handset within an actual room.

23. The apparatus of claim 21, wherein:

said putative live recording environment comprises a remote environment;

said providing comprises sending over a network;

said receiving comprises receiving over said network;

said means for examining comprise at least means for performing said Lombard analysis;

said second signal comprises a signal representative of purported live speech of said putative live speaker within said remote environment;

said determining whether characteristics of the audio response associated with the unpredictable audio stimulus are consistent with response characteristics observed in a live recording comprises determining at least one of increase in phonetic fundamental frequencies, shifts in energy away from low frequency bands, increase in sound intensity, increase in vowel duration, spectral tilting, shift in formant center frequencies, lung volume, larger facial movements, change in spectral characteristics, and prolonged duration of content words as compared to function words; and said means for making said determination comprise:

means for extracting the features from said first signal and said second signal; and means for comparing said extracted features with speaker-independent live and non-live models trained with Lombard and non-Lombard speech, respectively.

24. The apparatus of claim 21, wherein:

said putative live recording environment comprises a remote environment;

said providing comprises sending over a network;

said receiving comprises receiving over said network;

said means for examining comprise at least means for performing said evoked otoacoustic response analysis;

said second signal comprises a signal representative of an evoked otoacoustic response of said putative live speaker within said remote environment;

said determining whether characteristics of the audio response associated with the unpredictable audio stimulus are consistent with response characteristics observed in a live recording comprises an evoked otoacoustic response induced in an ear of said putative live speaker by said unpredictable audio stimulus; and said means for making said determination comprise:

means for extracting the features from said first signal and said second signal; and means for comparing said extracted features with speaker-independent live and non-live models trained with and without said stimulus, respectively.

* * * * *